W. H. HACKLEMAN.
GEAR CUTTING ATTACHMENT.
APPLICATION FILED FEB. 26, 1919.
1,329,175.
Patented Jan. 27, 1920.
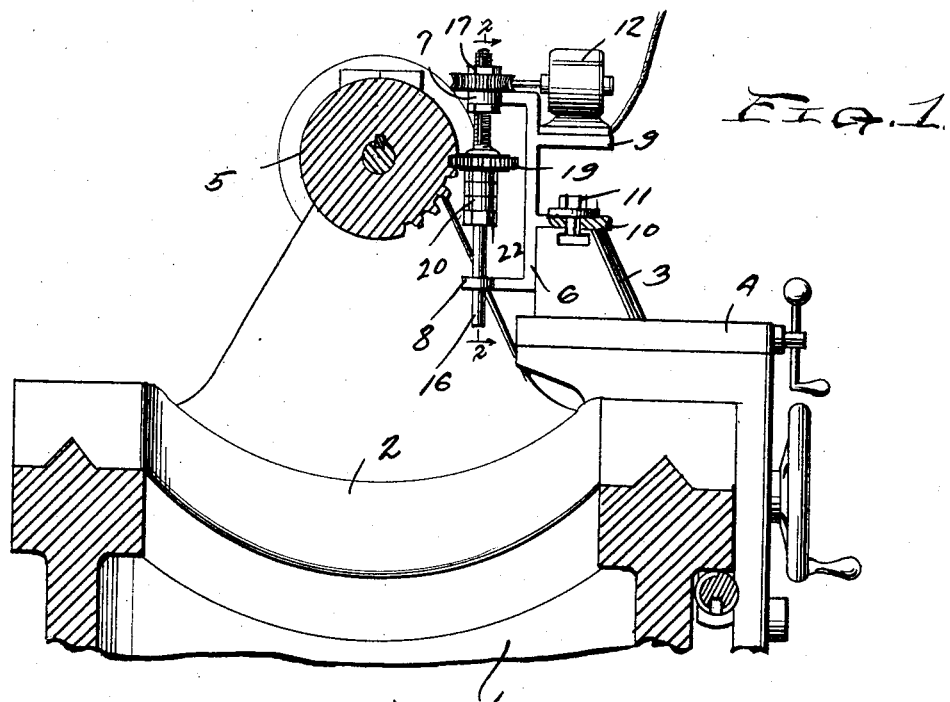
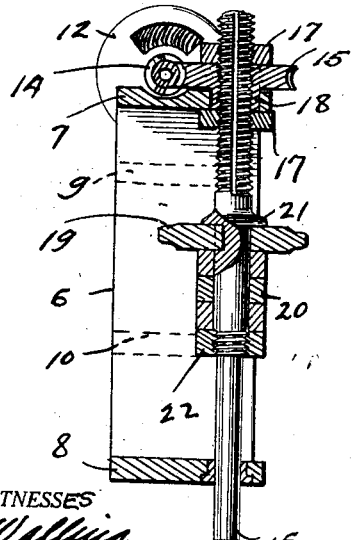
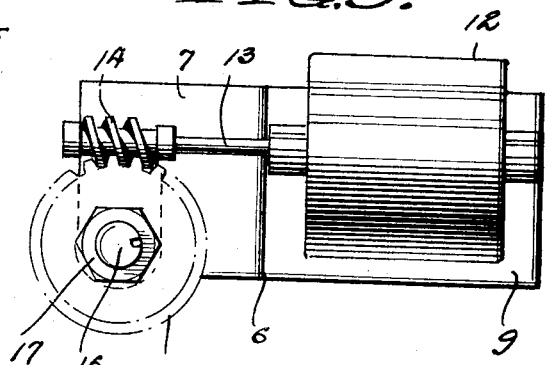
WITNESSES
Geo. W. Alling
U. B. Hillyard
INVENTOR.
William H. Hackleman
BY
Richard Eggleson
ATTORNEY.

UNITED STATES PATENT OFFICE.

WILLIAM H. HACKLEMAN, OF APPLETON, WISCONSIN.

GEAR-CUTTING ATTACHMENT.

1,329,175.  Specification of Letters Patent.  Patented Jan. 27, 1920.

Application filed February 26, 1919. Serial No. 279,301.

*To all whom it may concern:*

Be it known that I, WILLIAM H. HACKLEMAN, a citizen of the United States, residing at Appleton, in the county of Outagamie and State of Wisconsin, have invented certain new and useful Improvements in Gear-Cutting Attachments, of which the following is a specification.

The invention relates to an attachment for lathes for adapting the same for gear-cutting, milling and kindred work whereby teeth may be formed on disks, grooves cut in the sides of shafts or other bodies and whereby metal may be slit.

The invention consists of an attachment designed most especially to be applied to the slide rest or tool holder of a lathe, said attachment embodying a rotary cutter and a motor for driving the cutter. When the attachment is applied to the tool holder of a lathe work may be held in the lathe and the attachment moved relatively to the work by the means employed in connection with the lathe for moving the tool holder, the rotary cutter performing the work as the attachment is moved.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

Referring to the accompanying drawing,

Figure 1 is a sectional detail of a portion of a lathe showing the usual carriage, slide rest and the attachment in operative position.

Fig. 2 is a sectional detail of the attachment on the line 2—2 of Fig. 1, the parts being illustrated on a larger scale.

Fig. 3 is a top view of the attachment, the parts being shown on a slightly larger scale.

Corresponding and like parts are referred to in the following description and indicated in the several views of the drawing by like reference characters.

The numeral 1 designates the bed of a lathe and 2 the carriage mounted on the ways thereof. The tool post 3 may be of any ordinary formation and is mounted upon the slide rest 4 which is movable on the carriage in a manner well understood. These parts may be of any well known construction and are illustrated simply to demonstrate the application of the invention. In Fig. 1 the numeral 5 designates a piece of work held by the lathe in position to be operated upon by the attachment. The part 5 appears as a disk and the attachment is shown as forming teeth on the outer edge thereof.

The attachment comprises a frame 6 which is adapted to be secured to the tool post 3 in any manner. The frame 6 embodies a main member and offstanding portions 7, 8, 9 and 10. When in operative position the main member of the frame is disposed vertically and the offstanding portions horizontally, as indicated most clearly in Fig. 1. The frame is secured to the post 3 by suitable fastening means 11 passing through the offset portion 10. A motor 12 is mounted upon the upper offset portion 9 and its shaft 13 is provided with a worm 14 which is in mesh with the teeth of a worm gear 15 mounted upon a shaft 16 which is journaled in the offset portions 7 and 8 of the frame. The worm gear 15 is secured to the shaft 16 between lock nuts 17 and is formed upon its lower side with a collar 18 which obtains a bearing in the offset portion 7 of the frame.

A rotary cutter 19 is secured to the shaft 16 and may be of any design according to the particular work to be performed. For gear cutting, milling and slitting metal a cutter 19 best adapted for the work will be secured on the shaft 16. A plurality of collets 20 is mounted upon the shaft 16 to adapt the shaft for various forms of cutters. The collets 20 serve the purpose of spacing elements. The rotary cutter 19 and collets are clamped between a shoulder 21 and a binding nut 22, the latter being threaded upon a portion of the shaft 16.

It will be understood from the foregoing taken in connection with the accompanying drawing that the attachment is complete in itself since it embodies a rotary cutter, a motor and a transmission. When the attachment is secured to the tool holder or post 3 of the slide rest of a lathe the work designated at 5 in Fig. 1 is held in the lathe and the attachment is moved by the means associated with the slide rest, the rotary cutter 19 being driven by means of the motor 12 and the intermediate transmission. The attachment may be adapted for any special work by substituting a particular form of cutter 19 for the one illustrated and the cutter may be secured on the shaft 16 in the required adjusted position.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

In an attachment of the character specified, a frame including offstanding portions projecting therefrom in the same direction, a shaft journaled in the offstanding portions of the frame and adapted to receive a cutter, a gear wheel provided with a collar which is mounted in one of the offstanding portions of the frame and lock nuts for securing the gear wheel to the shaft and holding the latter and gear wheel in proper position relatively to the frame.

In testimony whereof I affix my signature in presence of two witnesses.

WILLIAM H. HACKLEMAN.

Witnesses:
  MARY C. KITZINGER,
  WILLIAM C. FISH.